(12) United States Patent
Rempel et al.

(10) Patent No.: US 9,732,166 B2
(45) Date of Patent: Aug. 15, 2017

(54) TANDEM METATHESIS AND HYDROGENATION OF DIENE-BASED POLYMERS IN LATEX

(71) Applicant: UNIVERSITY OF WATERLOO, Waterloo (CA)

(72) Inventors: Garry L. Rempel, Waterloo (CA); Qinmin Pan, Waterloo (CA); Yin Liu, Mississauga (CA); Jialong Wu, Waterloo (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 14/408,409

(22) PCT Filed: Jun. 21, 2013

(86) PCT No.: PCT/IB2013/001315
§ 371 (c)(1),
(2) Date: Dec. 16, 2014

(87) PCT Pub. No.: WO2013/190371
PCT Pub. Date: Dec. 27, 2013

(65) Prior Publication Data
US 2015/0232584 A1 Aug. 20, 2015

(30) Foreign Application Priority Data
Jun. 22, 2012 (EP) .................................... 12173161

(51) Int. Cl.
*C08C 19/02* (2006.01)
*C08C 19/00* (2006.01)

(52) U.S. Cl.
CPC .......... *C08C 19/02* (2013.01); *C08C 2019/09* (2013.01)

(58) Field of Classification Search
CPC ......... C08C 1/00; C08C 1/02; C08C 2019/09; C08C 19/02
See application file for complete search history.

(56) References Cited

U.S. PATENT DOCUMENTS

| | | |
|---|---|---|
| 5,021,469 A | 6/1991 | Langerbeins et al. |
| 5,087,676 A | 2/1992 | Heider et al. |
| 5,340,858 A | 8/1994 | Bauer et al. |
| 5,414,193 A | 5/1995 | Taylor et al. |
| 5,436,289 A | 7/1995 | Aydin et al. |
| 5,496,882 A | 3/1996 | Aydin et al. |
| 5,498,655 A | 3/1996 | Aydin et al. |
| 5,624,992 A | 4/1997 | Aydin et al. |
| 5,708,077 A | 1/1998 | Nolken et al. |
| 5,756,574 A | 5/1998 | Baumstark et al. |
| 5,905,129 A | 5/1999 | Murakami et al. |
| 5,994,457 A | 11/1999 | Stanger et al. |
| 6,197,894 B1 | 3/2001 | Sunaga et al. |
| 6,838,489 B2 | 1/2005 | Bell et al. |
| 7,585,920 B2 | 9/2009 | Guerin |
| 7,846,995 B2 | 12/2010 | Ong et al. |
| 7,951,875 B2 | 5/2011 | Guerin et al. |
| 8,058,351 B2* | 11/2011 | Pawlow .................. C08C 19/02 525/242 |
| 2009/0227444 A1 | 9/2009 | Ong et al. |

FOREIGN PATENT DOCUMENTS

| | | | |
|---|---|---|---|
| WO | WO 2011/023763 | * | 3/2011 |
| WO | WO 2013/056400 | * | 4/2013 |

OTHER PUBLICATIONS

Kongparakul, Applied Catalysis A: General, 405 (2011) 129-136.*
Rempel, Applied Catalysis A: General, 2011, vol. 405, No. 1-2, p. 129-136.*
Trnka T.M., "The Development of L2XRU=CHR Olefin Metathesis Catalysts: An Organometallic Success Story", Acc. Chem. Res. 2001, 34, p. 18.
McLain, S.J., New Routes to Ester and Acid Functionalized Polyethylene, Proc. Am. Chem. Soc., 1997, 76, p. 247.
Malacea, R., "Renewable materials as precursors of linear nitrile-acid derivatives via cross-metathesis of fatty esters and acids with acrylonitrile and fumaronitrile", Green Chemistry, 2009, 11, p. 152-155.
Korshak, Y.V., "Intra-and Intermolecular Metathesis Reactions in the Formation and Degradation of Unsaturated Polymers", Journal of Molecular Catalysis, 15, 1982, p. 207-218.
Solanky, S.S. "Metathetic Selective Degradation of Polyisoprene: Low-Molecular-Weight Telexhelic Oligomer Obtained from Both Synthetic and Natural Rubber", Macromolecular Chemistry and Physics, 2005, 206, p. 1057-1063.
"Methods of Organic Chemistry", Houben-Weyl, vol. XIV/1, Macromolecular Materials, 1961, pp. 193-208.
Watson, M.D., "Solvent-Free Olefin Metathesis Depolymerization of 1, 4-Polybutadiene", Macromolecules, 2000, 33, pp. 1494-1496.
Ullmann's Encyclopedia of Industrial Chemistry, 5th Edition, vol. A 21, pp. 372-393.
International Search Report from co-pending Application PCT/IB2013/001315 dated Sep. 26, 2013, 4 pages.

* cited by examiner

Primary Examiner — Robert C Boyle

(57) ABSTRACT

The present invention provides a novel process for subjecting a diene-based-polymer to a metathesis reaction in a first step and a selective hydrogenation of the carbon-carbon double bonds present in such diene-based polymers in a second step using a ruthenium or osmium based complex catalyst, wherein the diene-based polymer is present in latex form, this means as a suspension of diene-based polymer particles in an aqueous medium.

16 Claims, No Drawings

TANDEM METATHESIS AND HYDROGENATION OF DIENE-BASED POLYMERS IN LATEX

FIELD OF THE INVENTION

The present invention relates to a process for subjecting a diene-based polymer to a metathesis reaction in a first step and a selective hydrogenation of the carbon-carbon double bonds present in such diene-based polymers in a second step using a ruthenium or osmium based complex catalyst, wherein the diene-based polymer is present in latex form, this means as a suspension of diene-based polymer particles in an aqueous medium.

BACKGROUND OF THE INVENTION

Using unsaturated elastomers as substrates in olefin metathesis has been investigated for many years, with applications including molecular weight modification, microstructure elucidation via conversion to small molecules more amenable to characterization, the preparation of end-functionalized polymers and the recycling of commercial elastomers to chemical feedstock. A common feature of all resultant polymers reacted via metathesis is the unsaturation in the main chain, which limits their applications by the susceptibility of the carboncarbon double bonds to oxidative and thermal degradation. Therefore, hydrogenation of metathesed polymers is important to widen their range of applications.

Tandem metathesis/hydrogenation found an early application in the production of a polymer by the ring-opening polymerization of cyclic olefins. It allows the synthesis of lightweight, moldable polymers with desirable optical characteristics. During the tandem metathesis/hydrogenation process, the metathesed polymers are typically prepared, isolated, and purified prior to hydrogenation with additional reagents and/or catalysts. In U.S. Pat. No. 5,905,129 a binary catalytic system as e.g. $WCl_6/SntBu_4$ is used to catalyse ROMP of cyclic olefins and another catalyst is used for subsequent hydrogenation without the need of isolation of the polymer from the first step. In U.S. Pat. No. 6,197,894 a one-pot process of Mo-catalyzed ROMP, followed by homogeneous hydrogenation with $RuCl_2(PPh_3)_4$ under forcing conditions (165° C., above 70 atm $H_2$) has been described.

Homogeneous transition-metal catalysts are usually designed for a single reaction. Nowadays, the increasing demand for advantageous and efficient synthetic processes requires the development of tandem catalysis, in which one catalyst could be multi-functionalised, with two, or more, mechanistically distinct reactions being accomplished by single catalyst.

In the last decade, ruthenium carbene complexes have found extensive use in olefin metathesis, as for example reported by T. M. Trnka and R. H. Grubbs in Acc. Chem. Res. 2001, 34, 18. Meanwhile, these catalysts also showed to be effective catalysts for hydrogenation reactions. Tandem metathesishydrogenation processes using single ruthenium carbene complexes of the Grubbs-type $RuCl_2(=CHR)(PR'_3)_2$ as catalysts have been developed. For instance, McLain et al. have reported in Proc. Am. Chem. Soc.; Div. Polym. Mater. Sci. Eng. 1997, 76, 246 the synthesis of an ethylene/methylacrylate copolymer by the ROMP of an ester-functionalized cyclooctene using $RuCl_2(=CHCl=CPh_2)(PCy_3)_2$, followed by the application of hydrogenation to completed ROMP reaction at 135° C. Dixneuf et al. in Green Chemistry, 2009, 11, 152 synthesized nitrile acid derivatives and alcohols by tandem metathesis hydrogenation of ester and acrylonitrile and cross metathesis hydrogenation of aldehydes.

Although some scientific research of synthetic rubber metathesis has been reported in the literature, such reports have mainly concentrated on metathetic degradation only. For example, Dimitry F. Kutepov et al. disclosed in J. Mol. Catal. 1982, 15, 207 the metathetic cyclodegradation of cis-polyisoprene to low molecular weight oligomers, and the co-metathesis of cis-polyisoprene with linear olefins to yield linear cis-oligomers was carried out using $W[OCH(CH_2Cl)_2]_2Cl_4$—$AlEt_2Cl$-anisole as a catalyst.

W. B. Wagener et al. in Macromolecules 2000, 33, 1494 reported that the well defined ruthenium catalyst, $Cl_2(Cy_3P)_2Ru(=CHPh)$, effected the clean metathesis depolymerization of high molecular weight solid 1,4-polybutadiene at room temperature.

J-F. Pilard et al. in Macromol. Chem. Phys., 2005, 206, 1057 reported degradation studies of cis-1,4-polyisoprene using first and second generation Grubbs catalysts to achieve end-functionalized acetoxy oligomers in both an organic solvent and a latex phase at room temperature. Well-defined acetoxy telechelic polyisoprene structures were obtained in a selective manner with a range of Mn from 10,000 to 30,000, with a polydispersity index of around 2.5.

In WO2002/100941 A1 a process for preparing a hydrogenated nitrile rubber in an organic solvent is disclosed. In one embodiment of the reaction a nitrite rubber is subjected to metathetic degradation in a first step. Such metathesis is performed in organic solution using a ruthenium- or osmium based complex catalyst containing at least one carbene ligand like e.g. Grubbs II catalyst to achieve the decrease of the molecular weight of the initial nitrile rubber. Then, in a second step, however, without isolating the degraded nitrite rubber the reaction mixture is treated with hydrogen. In the presence of hydrogen Grubbs II catalyst, is converted to a dihydride complex $(PR_3)_2RuCl_2H_2$, which itself acts as an olefin hydrogenation catalyst and provides a high degree of hydrogenation. Thus, in a one-pot reaction a low molecular hydrogenated nitrile rubber can be obtained. However, this method occurred in an organic solution of the nitrile rubber. As the preparation of nitrile rubber is mostly conducted by water based emulsion polymerisation such type of reaction requires the isolation of the nitrile rubber after polymerisation prior to subjecting it to metathesis and hydrogenation which decreases the commercial attractiveness of the whole process.

WO 2005/080456 A describes the preparation of a hydrogenated nitrile rubber by hydrogenating nitrile rubber with a simultaneously occurring metathetic degradation of the nitrile rubber. Such process is conducted in the presence of a ruthenium- or osmium based complex catalyst containing at least one carbene ligand like e.g. Grubbs II catalyst and in an organic solvent, too. This process therefore suffers the same drawback as the process of WO2002/100941 A1 with regard to the necessary isolation of the nitrile rubber after the polymerisation reaction. Additionally it may be difficult to control two different activities, i.e. the metathetic and the hydrogenation activity of the catalyst and therefore to obtain hydrogenated nitrile rubber with reproducible molecular weights and hydrogenation degree.

The present invention therefore has the object to provide a process allowing combining the metathetic degradation and hydrogenation of a diene-based polymer present in an aqueous suspension, i.e. as a latex, to obtain a hydrogenated nitrile rubber with a lowered molecular weight and a high degree of hydrogenation within acceptable short reaction times.

SUMMARY OF THE INVENTION

The present invention provides a process for preparing a hydrogenated diene-based polymer comprising subjecting a diene-based polymer to a metathetic degradation in a first step and to a hydrogenation in the second step characterized in that
a) the diene-based polymer is present in aqueous suspension and both steps are performed in such aqueous suspension, and
b) both steps are performed in the presence of at least one catalyst chosen from the group consisting of
    (i) compounds having the general formula (A) and

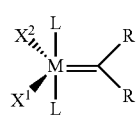

(A)

(ii) compounds having the general formula (B)

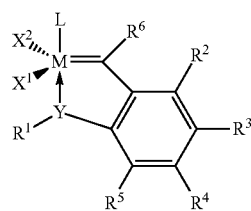

(B)

wherein
M is osmium or ruthenium,
$X^1$ and $X^2$ are identical or different anionic ligands,
L are identical or different ligands, preferably uncharged electron donors, wherein in general formula (A) both ligands L may also be linked to each other thereby forming a bidentate ligand,
R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these radicals may in each case optionally be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms, Y is oxygen (O), sulphur (S), an N—$R^1$ radical or a P—$R^1$ radical, where $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical, and
$R^6$ is hydrogen or an alkyl, alkenyl, alkynyl or aryl radical.

DETAILED DESCRIPTION OF THE INVENTION

The novel process according to the present invention is capable of producing in the first step a diene-based polymer present in an aqueous suspension having a smaller molecular weight and a narrow molecular weight distribution and in a second step of selectively hydrogenating the carbon-carbon double bonds of such diene-based polymer. Favourably this process can be conducted using the diene-based polymer in aqueous suspension as directly obtained after the emulsion polymerisation. Such aqueous suspension of a diene-based polymer is often also called "latex". The novel process may also be referred to as a "tandem metathesis and hydrogenation reaction". Secondly the novel process represents a "one-pot" process, this means there is no need to isolate the diene-based polymer after the first metathesis step before subjecting it to the subsequent hydrogenation. Preferably the diene-based polymer is not isolated after the first step. The novel process only requires to add hydrogen in order to perform the second step of selective hydrogenation. The selectivity of the catalyst during hydrogenation ensures that the double bonds in for example aromatic or naphthenic groups are not hydrogenated and double or triple bonds between carbon and other atoms such as nitrogen or oxygen are also not affected.

Diene-Based Polymers to be Subjected to the Process According to the Invention:

Suitable substrates for the process of the present invention are in principle all aqueous suspensions of diene-based polymers which are also called "latex". Such diene-based polymers contain carbon-carbon double bonds. These latices include both suspensions prepared by free-radical polymerization of aqueous monomer emulsions (primary suspensions) and those whose polymers have been prepared by whatever method or route and are then converted to an aqueous suspension form (secondary suspensions). The term "aqueous suspension" also embraces, in principle, suspensions of microcapsules. Preferably the process of the present invention uses primary suspensions.

Polymers having carbon-carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of not only at least one conjugated diene as monomer (a) but additionally at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further suitable copolymers have repeating units derived from at least one conjugated diene and from at least one monomer (b) selected from the group consisting of esters of ethylenically unsaturated mono- or dicarboxylic acids such as acrylic acid, methacrylic acid, maleic acid, fumaric acid and itaconic acid with generally $C_1$-$C_{12}$ alkanols, such as methanol, ethanol, n-propanol, isopropanol, 1-butanol, 2-butanol, isobutanol, tert.-butanol, n-hexanol, 2-ethylhexanol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are α,β-unsaturated nitriles. It is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A suitable copolymer to be used in the present invention is a so called nitrile rubber (also abbreviated as "NBR") this being a copolymer having repeating units of at least one conjugated diene, preferably 1,3-butadiene, at least one α,β-unsaturated nitrile, preferably acrylonitrile, and optionally one or more further copolymerizable monomers.

A particularly preferred nitrile rubber is thus a copolymer having repeating units derived from acrylonitrile and 1,3-butadiene.

Apart from the conjugated diene and the α,β-unsaturated nitrile, the nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferred termonomers of such nitrile rubbers.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such asmethylacrylate, ethylacrylate, propylacrylate, n-butylacrylate, tert.-butylacrylate, 2-ethylhexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-cycloalkyl-, more preferably $C_6$-$C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, in which the number of C atoms in the cyanoalkyl group is in the range of from 2 to 12, preferably α-cyanoethyl acrylate, β-cyanoethyl acrylate or cyanobutyl methacrylate are used.

In another embodiment hydroxyalkyl esters are used, in particular hydroxyalkyl acrylates and hydroxyalkyl methacrylates in which the number of C-atoms in the hydroxylalkyl group is in the range of from 1 to 12, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. polyethyleneglycol(meth) acrylate, polypropyleneglycole(meth)acrylate, glycidyl (meth)acry late, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_1$,-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,□β-ethylenically unsaturated dicarboxylic acid monoester monomers include
  maleic acid monoalkyl esters, preferably monomethyl maleate, monoethyl maleate, monopropyl maleate, and mono n-butyl maleate;
  maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As $\alpha,\beta$-ethylenically unsaturated dicarboxylic acid diester monomers the analoguos diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Composition of Co- and Terpolymers to be Subjected to the Present Process:

In case that the polymer to be subjected to the present process comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used in the present process the proportion of or of the sum of the conjugated dienes is usually in the range from 40 to 90% by weight, preferably in the range from 50 to 85% by weight, based on the total polymer. The proportion of or of the sum of the $\alpha,\beta$-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the $\alpha,\beta$-unsaturated nitrile(s) are replaced by the proportions of the additional termonomers, with the proportions of all monomers in each case adding up to 100% by weight.

The preparation of nitrile rubbers by polymerization of the above mentioned monomers is adequately known to those skilled in the art and is comprehensively described in the polymer literature.

The nitrile rubbers used pursuant to this invention have a Mooney viscosity (ML 1+4 at 100° C.) in the range from 25 to 70, preferably from 30 to 50. This corresponds to a weight average molecular weight $M_w$ in the range 200.000-500.000, preferably in the range 200.000-400.000. A nitrile rubber having a Mooney viscosity of about 34 e.g. has an intrinsic viscosity, determined in chlorobenzene at 35° C., of about 1.1 dL/g. The nitrile rubbers used also have a polydispersity $PDI=M_w/M_n$, where $M_w$ is the weight average molecular weight and $M_n$ is the number average molecular weight, in the range of from 2.0 to 6.0 and preferably in the range 2.0-4.0. The determination of the Mooney viscosity is carried out in accordance with ASTM standard D 1646.

If a polymer is used in the present invention which contains repeating units of one or more conjugated dienes and optionally one or more other copolymerizable monomers like e.g. styrene or alpha-methylstyrene the proportion of the conjugated diene(s) is usually from 15 to 100% b.w. and the proportion of or of the sum of the copolymerizable termonomer(s) is from 0 to 85 b.w. If as other copolymerizable monomers styrene or alphamethyl styrene are used, the proportion of styrene and/or a methyl styrene is preferably from 15 to 60% b.w., while the remainder to 100% b.w. is represented by the conjugated diene(s).

The carbon-carbon double bond containing polymer in the latex form useful in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process as this process directly yields the latex form of the polymer.

Preferably, according to the present invention, the polymer solid content in the aqueous emulsion lies in the range of from 1 to 75% by weight, more preferably from 5 to 30% by weight based on the total weight of the aqueous emulsion.

The preparation of such polymers which are subjected to the process pursuant to this invention is known to the skilled worker and can in principle be carried out by anionic, free-radical or Ziegler-Natta polymerization in solution, in bulk, in suspension or in emulsion. Depending on the type of reaction, the conjugated dienes are 1,4- and/or 1,2 polymerized. For the hydrogenation process of the invention it is preferred to employ polymers prepared by free-radical aqueous emulsion polymerization of the above mentioned monomers (a) and (b). These techniques are sufficiently well known to the skilled worker and are described at length in the literature, for example in Ullmann's Encyclopedia of Industrial Chemistry, $5^{th}$ Edition, Volume A 21, pp 373-393.

In general such polymers are prepared in the presence of free-radical initiators and, if desired, surface-active substances such as emulsifiers and protective colloids (see for example Houben Weyl, Methoden der organischen Chemie, Volumen XIV/1, Makromolekulare Stoffe, Georg Thieme Verlag, Stuttgart, 1961, pp 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid byx the sodium salt of hydroxymethanesulfinic acid, sodium sulfite, sodium hydrogensulfite or sodium bisulfite and the hydrogen peroxide by tert-butyl peroxid, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01 to 5, preferably from 0.1 to 2.0% b.w., based on the monomers to be polymerized.

The monomer mixtures can, if desired, be polymerized in the presence of customary regulators, such as mercaptans, an example of which is tert.-dodecyl mercaptan. These regulators are then used in an amount of from 0.01 to 5% b.w., based on the overall amount of the mixture.

There are no particular restrictions on the emulsifiers that can be used. Preference is given to neutral emulsifiers such as ethoxylated mono, di- and trialkylphenols (ethyleneoxide degree: 3 to 50; Alkyl $C_4$ to $C_9$) or ethoxylated fatty alcohols (ethyleneoxide degree: 3 to 50; alkyl $C_4$ to $C_9$) and/or anionic emulsifiers, such as the alkali metal and ammonium salts of fatty acids (alkyl: $C_{12}$ to $C_{24}$), of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_{4-24}$ alkyl derivatives of bis(phenylsulfonic acid)ether.

Particular preference is given to the alkali metal and/or ammonium salts, especially the sodium salts, of alkylarylsulfonic acids, alkylsulfonic acids (eg. sulfonated $C_{12}$-$C_{18}$ paraffin), alkylsulfates (eg. sodium lauryl sulfonate) and of the sulphuric monoesters of ethoxylated alkanols (eg. sulfoxylated ethoxylate of lauryl alcohol with 2 to 3 ethyleneoxide units). Further suitable emulsifiers are the sodium or potassium salts of fatty acids ($C_{12}$-$C_{23}$-alkyl radicals), such as potassium oleate. Additional appropriate emulsifiers are given in Houben-Weyl, loc. Cit., pp. 192-208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer suspension as polymer (seed latex). Such techniques are fundamentally known to the skilled worker and are described for example, in DE-A 42 13 967, DE-A 42 13 968, EP-A 567 811, EP 567 812 or EP 567 819, which are incorporated fully herein by reference. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably fro 20 to 60 nm and in particular, about 30 nm. Preference is given to the use of a polystyrene seed.

The polymerization reaction is preferably carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C.

The polymer suspensions prepared in this way generally have solid contents of up to 75% by weight. For use in the hydrogenation process of the invention it is possible to employ the suspensions with these solid contents. In some cases, however, it is advisable to dilute the suspensions to an appropriate solid content beforehand. The solid content of the suspensions employed is preferably in the range from 5 to 30% by weight, based on the overall weight of suspension.

The surface-active substances still present, in general, in the polymer suspensions, and further substances used, for example, as customary polymerization auxiliaries in emulsion polymerizations, do not have a disruptive effect on the hydrogenation process of the invention.

However, it is advisable to subject the polymer suspensions to chemical or physical deodorization before hydrogenation. Physical deodorization, by stripping the residual monomers with steam, is known, for example, from EP-A 584 458. EP-A 327 006 for its part recommends the use of conventional distillation methods. Chemical deodorization takes place preferably by means of a post polymerization following the main polymerization. Such processes are described, for example, in DE-A 383 4734, EP-A 379 892, EP-A 327 006, DE-A 44 19 518, DE-A 44 35 422 and DE-A 44 35 423.

Catalysts to be used in the Process According to the Invention:

The process according to the present invention is conducted in the presence of at least one catalyst selected from the group consisting of (i) compounds of the general formula (A) and

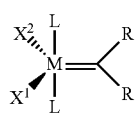

(A)

(ii) compounds having the general formula (B)

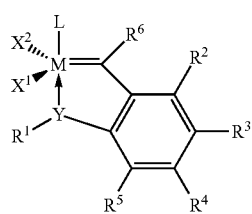

(B)

wherein

M is osmium or ruthenium, $X^1$ and $X^2$ are identical or different anionic ligands, L are identical or different ligands, preferably uncharged electron donors, wherein in general formula (A) both ligands L may also be linked to each other thereby forming a bidentate ligand, R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these radicals may in each case optionally be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms, Y is oxygen (O), sulphur (S), an N—$R^1$ radical or a P—$R^1$ radical, where $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, and $R^6$ is hydrogen or an alkyl, alkenyl, alkynyl or aryl radical.

$X^1$ and $X^2$:

In the catalysts of the general formula (A) and (B), $X^1$ and $X^2$ are identical or different and represent anionic ligands.

In one embodiment of the catalysts of general formula (A) and (B), $X^1$ represents hydrogen, halogen, pseudohalogen, straight-chain or branched $C_1$-$C_{30}$-alkyl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$ alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ is halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{14}$-arylthiol, $C_6$-$C_{14}$-aryl or $C_1$-$C_5$-alkylsulfonate.

In a particularly preferred embodiment, $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$).

R:

In preferred catalysts of the general formula (A), one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals.

L:

In the general formulae (A) and (B), the symbols L represent identical or different ligands and are preferably uncharged electron donors.

The ligands L can, for example, be, independently of one another, a phosphine, sulphonated phosphine, phosphate, phosphinite, phosphonite, arsine, stibine, ether, amine, amide, sulphoxide, carboxyl, nitrosyl, pyridine, thioether or a N-heterocyclic carbene ligand.

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S$(=O) and $(C_6H_5)_2S$=O.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine-based ligands" is used as a collective term for all pyridine-based ligands or derivatives thereof as mentioned, for example, in WO-A-03/011455. The term "pyridine-based ligands" hence includes pyridine itself, picolines (like α-, β- and γ-picoline), lutidines (like 2,3-, 2,4-, 2,5-, 2,6-, 3,4- and 3,5-lutidine), collidine (namely 2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If L represent(s) a phosphine as electron-donating ligand in general formula (A) or (B) such phosphine preferably has the general formula (IIf)

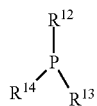
(IIf)

wherein $R^{12}$, $R^{13}$ and $R^{14}$ are identical or different, even more preferably identical, and can represent $C_1$-$C_{20}$ alkyl, preferably methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, or neophenyl, $C_3$-$C_8$-cycloalkyl, preferably cyclopropyl, cyclobutyl, cyclopentyl, cyclohexyl, cycloheptyl or cyclooctyl, $C_1$-$C_{20}$ alkoxy, substituted or unsubstituted $C_6$-$C_{20}$ aryl, preferably phenyl, biphenyl, naphthyl, phenanthrenyl, anthracenyl, tolyl, 2,6-dimethylphenyl, or trifluoromethyl, $C_6$-$C_{20}$ aryloxy, $C_2$-$C_{20}$ heteroaryl with at least one heteroatom in the cycle, a $C_2$-$C_{20}$ heterocyclyl with at least one heteroatom in the cycle or halogen, preferably fluoro;

If L represent(s) a phosphine of general formula (Ill) as electron-donating ligand in general formula (A) or (B) such phosphine preferably represents $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{---}SO_3Na)_3$, $P(CH_2C_6H_4\text{---}SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$, wherein Ph means phenyl and Tol means tolyl.

The N-heterocyclic carbene ligand represents a cyclic carbene type ligand with at least one nitrogen as hetero atom being present in the ring. The ring can exhibit different substitution patterns on the ring atoms. Preferably this substitution pattern provides a certain degree of steric crowing.

In the context of this invention the N-heterocyclic carbene ligand(s) (hereinafter referred to as "NHC-ligand(s)") is/are preferably based on imidazoline or imidazolidine moieties.

The NHC-ligand typically has a structure corresponding to the general formulae (IIa) to (IIe)

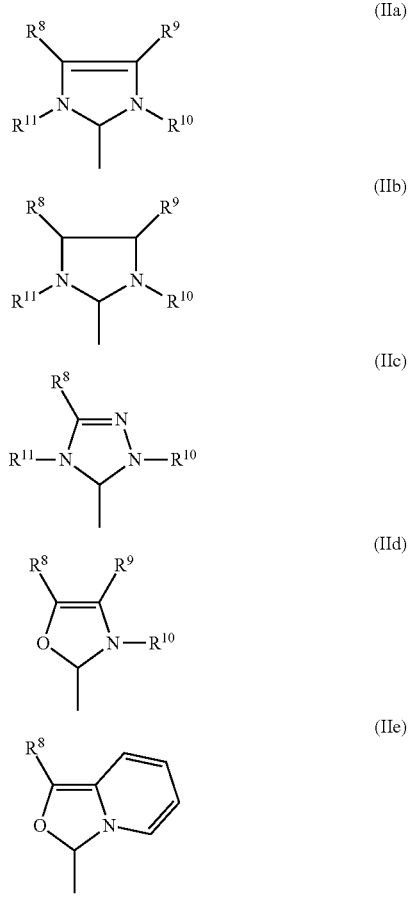

wherein $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, ---$Si(R)_3$, ---O---$Si(R)_3$, ---O---C(=O)R, C(=O)R, ---C(=O)N$(R)_2$, ---NR---C(=O)---N$(R)_2$, ---$SO_2N(R)_2$, ---S(=O)R, ---S(=O)$_2$R, ---O---S(=O)$_2$R, halogen, nitro or cyano; wherein in all above occurences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

In these formulae (IIa) to (IIe) the carbon atom bonding to the Ruthenium metal center is formally a carbene carbon.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy, $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein the abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the NHC-ligand depicted in the general formulae (IIa) and (IIb) in the present patent application are equivalent to the structures (IIa-(i)) and (IIb-(i)) which are frequently also found in the literature for such NHC-ligands, respectively, and emphasize the carbene character of the NHC-ligand. This applies analogously to the further structures (IIe) to (IIe) as well as the associated preferred structures (IIIa)-(IIIu) depicted below.

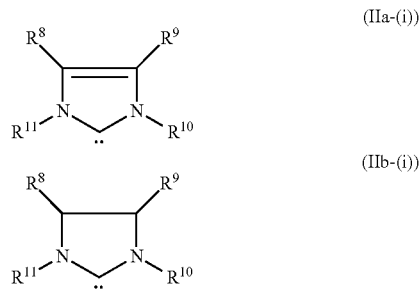

In preferred NHC-ligand(s) in the catalysts of the general formula (A) or (B)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, i-butyl or tert.-butyl or form a cycloalkyl or aryl structure together with the carbon atoms to which they are bound.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherin all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In further preferred NHC-ligand(s) in the catalysts of the general formula (A) or (B)

$R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In preferred NHC-ligand(s) in the catalysts of the general formula (A) or (B)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, and i-butyl, or form a cycloalkyl or aryl structure together with the carbon atoms to which they are bound, and $R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

Particularly preferred NHC-ligands have the following structures (IIIc) to (IIIu), where "Ph" means in each case phenyl, "Bu" means in each case butyl, i.e. either n-butyl, sec.-butyl, iso-butyl or tert.-butyl, "Mes" represents in each case 2,4,6-trimethylphenyl, "Dipp" means in all cases 2,6-diisopropy 1phenyl and "Dimp" means in each case 2,6-dimethylphenyl.

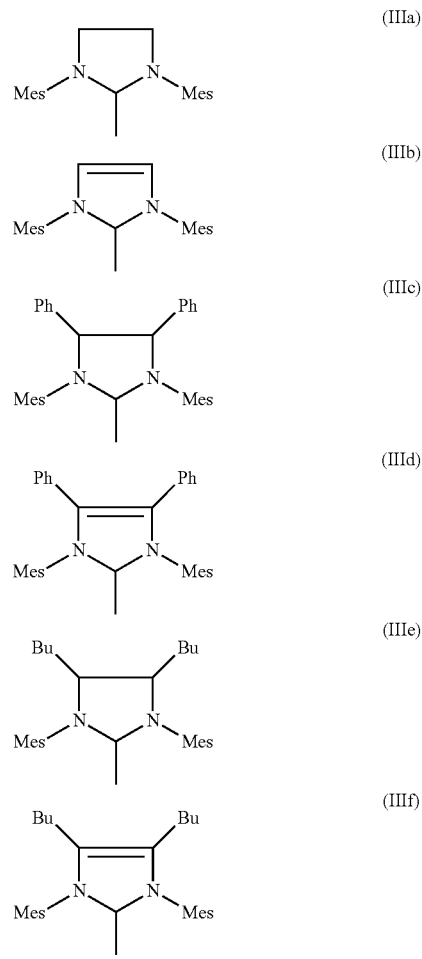

-continued

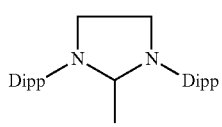
(IIIg)

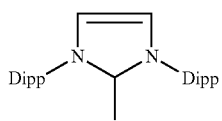
(IIIh)

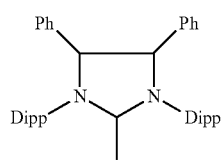
(IIIj)

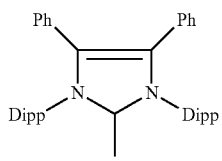
(IIIk)

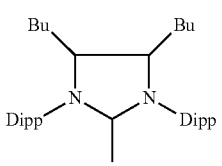
(IIIm)

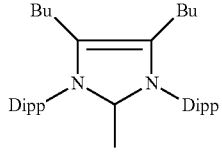
(IIIn)

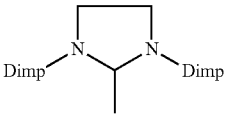
(IIIp)

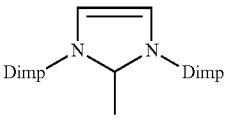
(IIIq)

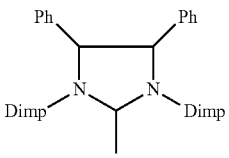
(IIIr)

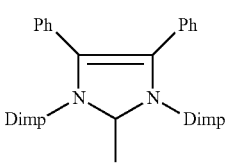
(IIIs)

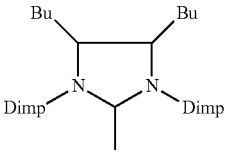
(IIIt)

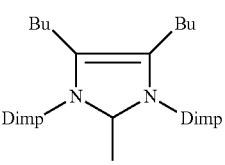
(IIIu)

Where the NHC-ligand contains not only an "N" (nitrogen), but also an "O" (oxygen) in the ring it is preferred that the substitution pattern of $R^8$, $R^9$, $R^{10}$ and/or $R^{11}$ provides a certain steric crowding.

In the general formula (B), the substituent $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or allcylsulphinyl radical which may in each case optionally be substituted by one or more alkyl, halogen, alkoxy, aryl or heteroaryl radicals.

The substituent $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical which may in each case optionally be substituted by one or more alkyl, halogen, alkoxy, aryl or heteroaryl radicals.

$R^1$ is preferably a $C_3$-$C_{20}$-cylcoalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

$C_3$-$C_{20}$-Cycloalkyl radicals encompass, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may be in each case optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cylcoalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (B), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

In a preferred embodiment preference is given to using catalysts of general formula (A) wherein
M is Ruthenium,
$X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$),
L are identical or different and represent a phosphine, sulphonated phosphine, phosphate, phosphinite, phosphonite, arsine, stibine, ether, amine, amide, sulphoxide, carboxyl, nitrosyl, pyridine, thioether or a N-heterocyclic carbene ligand, and
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals.

In an even more preferred embodiment preference is given to using catalysts of general formula (A) wherein
M is ruthenium
$X^1$ represents chlorine,
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals, and
L are identical or different and are selected from the group consisting of $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, wherein Ph means phenyl and Tol means tolyl.

In a further even more preferred embodiment preference is given to using catalysts of general formula (A) wherein
M is ruthenium
$X^1$ represents chlorine,
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals,
one L is selected from the group consisting of $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, wherein Ph means phenyl and Tol means tolyl, and
one L represents a N-heterocyclic carbene ligand according to general formulae (IIa) to (IIe)

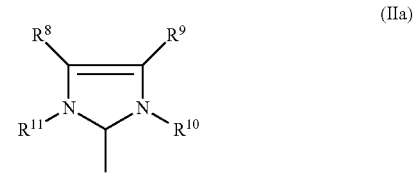

(IIa)

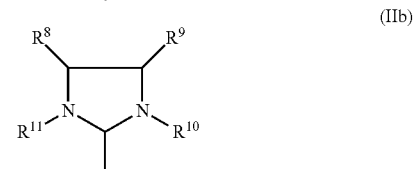

(IIb)

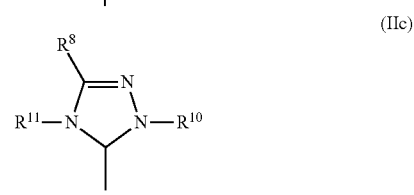

(IIc)

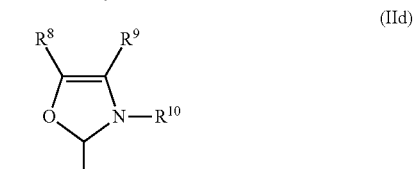

(IId)

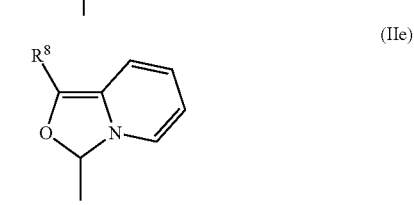

(IIe)

wherein
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

In a preferred embodiment preference is given to using catalysts of general formula (B) wherein M is ruthenium $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$), Y is oxygen, $R^1$ is $C_3$-$C_{20}$-cylcoalkyl, $C_6$-$C_{24}$-aryl or a straight-chain or branched $C_1$-$C_{30}$-alkyl radical, with the latter being optionally interrupted by one or more double or triple bonds or one or more heteroatoms, preferably oxygen or nitrogenm, and $R^2$, $R^3$, $R^4$, $R^5$ are identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

In an even more preferred embodiment preference is given to using catalysts of general formula (B) wherein M is ruthenium.

$X^1$ represents chlorine,

Y is oxygen, $R^1$ is a straight-chain or branched $C_1$-$C_{12}$-alkyl radical, $R^2$, $R^3$, $R^4$, $R^5$ are identical or different and are each hydrogen, chlorine or bromine, nitro, $CF_3$, $C_1$-$C_{10}$-alkyl, $C_3$-$C_{10}$-cylcoalkyl, $C_2$-$C_{10}$-alkenyl, $C_2$-$C_{10}$-alkynyl, $C_6$-$C_{14}$-aryl, $C_1$-$C_{10}$-alkoxy, $C_2$-$C_{10}$-alkenyloxy, $C_2$-$C_{10}$-alkynyloxy, $C_6$-$C_{14}$-aryloxy, $C_2$-$C_{10}$-alkoxycarbonyl, $C_1$-$C_{10}$-alkylamino, $C_1$-$C_{10}$-alkylthio, $C_6$-$C_{14}$-arylthio, $C_1$-$C_{10}$-alkylsulphonyl or $C_1$-$C_{10}$-alkylsulphinyl which may in each case optionally be substituted by one or more $C_1$-$C_{10}$-alkyl, $C_1$-$C_{10}$-alkoxy, halogen, $C_6$-$C_{14}$-aryl or heteroaryl radicals.

Particular preference is given to catalysts having the structures (IV) (Grubbs I catalyst), (V) (Grubbs II catalyst, namely 1,3-bis(2,4,6-trimethylphenyl)-2-imidazolidinylidene) (tricyclohexyl-phosphine) ruthenium (phenylmethtlene)dichloride or (VI) (Hoveyda-Grubbs catalyst), where Cy is cyclohexyl.

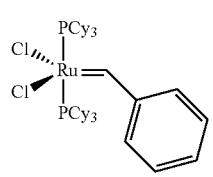

(IV)

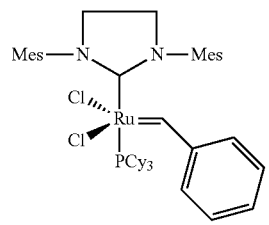

(V)

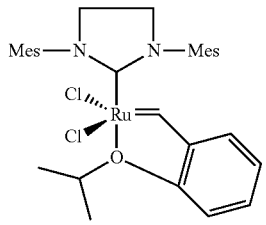

(VI)

Process Parameters:

The first step of metathetic degradation is usually carried out at a temperature in the range from 10° C. to 150° C., preferably at a temperature in the range from 20 to 100° C., and the second step of a hydrogenation is typically carried out at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

In the process according to the invention the at least one catalyst selected from compounds of formulae (A) and (B) is used in an amount in the range of from 0.01 to 5.0% by weight, preferably of from 0.02% to 2.0% by weight based on the weight of the polymer solids content of the latex. The catalysts according to formulae (A) and (B) are water-insoluble. Therefore they are typically dissolved in a small amount of an organic solvent and then dosed into the aqueous suspension containing the diene-based polymer to be subjected to the process of the present invention. Suitable organic solvents to dissolve the catalysts according to formulae (A) and (B) include, but are not limited to, dichloromethane, benzene, toluene, tetrahydrofuran, methyl ethyl ketone, and cyclohexane. The most preferred solvent is monochlorobenzene (MCB). In a typical embodiment of the present invention the water of the aqueous diene-based polymer suspension and the organic solvent used to dissolve the catalyst are used in a volume ratio of 100:1 to 5:1, preferably of 50:1 to 10:1.

The metathesis reaction in the first step of the process according to the invention can be performed in the absence or in the presence of a so called co-olefin. This is preferably a straight-chain or branched $C_2$-$C_{16}$-olefin. Suitable co-olefins are, for example, ethylene, propylene, isobutene, styrene, 1-hexene, 1-octene and 1-dodecene. Preference is given to using 1-hexene or 1-octene. If the co-olefin is liquid (for example as in the case of 1-hexene), the amount of co-olefin is preferably in the range 0.2-20% by weight based on the NBR used. If the co-olefin is a gas, for example as in the case of ethylene, the amount of co-olefin is preferably selected so that a pressure in the range $1 \times 10^5$ Pa-$1 \times 10^7$ Pa, preferably a pressure in the range from 5.2×10⁵ Pa to 4×10⁶ Pa, is established in the reaction vessel at room temperature.

The progress of the metathesis reaction may be monitored by standard analytical techniques, for example using GPC. Whenever referenced throughout the specification the molecular weight distribution of the polymer was determined by gel permeation chromatography (GPC) using a Viscotek TDAmax equipped with an RI and UV detector. Samples were dissolved in tetrahydrofuran (THF). Reference Standards used were polystyrene standards.

Hydrogenation in this invention is understood by preferably at least 50% of the residual double bonds (RDB) present in the starting diene-based polymer being hydrogenated, preferably 70%-100%, more preferably 80%-100%, even more preferably 90%-100% and most preferably 95%-100%.

Preferably, the hydrogenation time of the diene-based polymer is from 10 minutes to 24 hours, preferably from 15 minutes to 20 hours, more preferably from 30 minutes to 4 hours, even more preferably from 1 hour to 8 hours and most preferably from 1 hour to 3 hours.

Firstly, the aqueous suspension of the diene-based polymer is contacted with the organic solution of the at least one catalyst chosen from the compounds of formulae (A) and (B). The concentration of the diene-based polymer in the suspension is not critical. The concentration of the diene-based polymer in the reaction mixture is preferably in the range from 1 to 25% by weight, particularly preferably in the range from 5 to 20% by weight, based on the total reaction mixture. After allowing the metathesis to take place for an adequate time the aqueous suspension is then brought into with hydrogen at the pressure mentioned above. The reaction mixture is typically stirred or any kind of shear is introduced to allow sufficient contact of the suspension with the hydrogen phase.

One major advantage of the present invention resides in the fact that the complex catalyst used is very active, so that the catalyst residue in the final hydrogenated polymer products can be low enough to make the catalyst metal removal or recycle step alleviated or even unnecessary. However, to the extent desired, the catalysts used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen which leads to a bonding of the catalyst to the resin while the reaction mixture can be worked up with the usual finishing methods.

The rubber can then be obtained from the solution by known workup procedures such as steam coagulation, solvent evaporation or precipitation and dried to a degree that allows usage in typical rubber processing methods.

EXAMPLES

The following examples with the experimental conditions shown below illustrate the scope of the invention and are not intended to limit the same. The materials which were used in the both metathesis and hydrogenation reaction are listed in Table 1.

TABLE 1

| Specification of the Materials | |
|---|---|
| Materials | Supplier |
| Butadiene-acrylonitrile polymer in latex form; solid content of 19.5 wt %; containing 66% butadiene and 34% acrylonitrile, Mw 240,000 g/mol; PDI = 3.01; mean diameter of the polymer particles in the latex: about 72 nm | LANXESS Emulsion Rubber S.A. |
| Grubbs catalyst, first generation (G1) | Sigma-Aldrich |
| Grubbs catalyst, second generation (G2) | Sigma-Aldrich |

TABLE 1-continued

Specification of the Materials

| Materials | Supplier |
|---|---|
| Hoveyda-Grubbs catalyst, second generation (HG2) | Sigma-Aldrich |
| Hydrogen (99.999%) | Praxair |
| Nitrogen (99.999%) | Praxair |
| Propylene (99%) | Praxair |
| Styrene (Reagent grade) | Sigma-Aldrich |
| 1-Hexene (Reagent grade) | Sigma-Aldrich |
| Mono-chlorobenzene (Reagent grade) | Fisher Scientific |
| Methyl ethyl ketone (99%) | Sigma-Aldrich |

Example 1

The tandem metathesis hydrogenation reaction was carried out in a 300 mL Parr 316 Stainless Steel reactor. The latex of a butadiene-acrylonitrile polymer identified in Table 1 was used. The Grubbs catalyst second generation (G2) (0.0195 g) was dissolved in 5 mL mono-chlorobenzene (MCB) in the glove box and transferred to a catalyst solution adding cylinder (20 mL). At first 20 mL of such a latex and 80 mL water were charged into the reactor. After assembling the reactor, the NBR latex was degassed by bubbling nitrogen gas under about 1.38 MPa (200 psi) for 20 min at room temperature and the catalyst solution was quickly added to the NBR latex under the nitrogen gas for metathesis reaction. Samples of the NBR latex were removed from the reaction system through a dip tube at intervals during the reaction to measure the molecular weight change. After several hours, the temperature was increased to the 100° C. for hydrogenation. Then, the hydrogen gas was added to the reactor. The hydrogen pressure and reaction temperature were kept constant throughout the reaction period. Samples of the hydrogenated NBR latex were also removed from the reaction system through a dip tube at intervals during the reaction. The results are shown in Table 2. After 10 hours of metathesis, the molecular weight $M_w$ of the nitrile rubber decreased from 240,000 to 138,131 and the initial PDI of 3.01 decreased to 2.5. After 3 hours hydrogenation, the hydrogenation degree reached 99%. No visible gel was generated and the resultant polymer was easy soluble in methyl ethyl ketone.

Example 2

The same procedure as described in example 1 was employed except only 0.0195 g of Grubbs catalyst first generation (G1) was used. After 10 hours of metathesis, the molecular weight $M_w$ of the nitrile rubber decreased from 240,000 to 180,812 with a PDI of 2.7. After 12 hours hydrogenation, the hydrogenation degree reached 93%. No visible gel was generated and the resultant polymer was easy soluble in methyl ethyl ketone.

Example 3

The same procedure as described in example 1 was employed except 0.0310 g of Grubbs catalyst second generation (G2) was used. The catalyst was dissolved in 10 ml MCB before adding to the latex. After 15 hours of metathesis, the molecular weight $M_w$ of the nitrile rubber greatly decreased from 240,000 to 78,192 with a PDI of 2.3. After 2 hours of hydrogenation, the hydrogenation degree reached 99%. No visible gel was generated and the resultant polymer was easy soluble in methyl ethyl ketone.

Example 4

The same procedure as described in example 1 was employed except the catalyst was first mixed with 10 ml of styrene as co-olefin before adding to the latex. After 6 hours of metathesis, the molecular weight $M_w$ of the nitrile rubber decreased from 240,000 to 60,207 with a PDI of 2.2. After 3 hours hydrogenation, the hydrogenation degree reached 98%. No visible gel was generated and the resultant polymer was easy soluble in methyl ethyl ketone.

Example 5

The same procedure as described in example 4 was employed except the catalyst was first mixed with 10 ml of styrene as co-olefin and 10 ml MCB before adding to the latex. After 6 hours of metathesis, the molecular weight $M_w$ of the nitrile rubber decreased from 240,000 to 30,433 with a PDI of 2.1. After 1 hour of hydrogenation, the hydrogenation degree reached 99%. No visible gel was generated and the resultant polymer was easy soluble in methyl ethyl ketone.

Example 6

The same procedure as described in example 1 was employed except 1.03 MPa (150 psi) of propylene as co-olefin was purged to the reactor during the metathesis period. After 5 hours of metathesis, the molecular weight $M_w$ of the nitrile rubber decreased from 240,000 to 96,782 with a PDI of 2.4. After 3 hours hydrogenation, the hydrogenation degree reached 98%. No visible gel was generated and the resultant polymer was easy soluble in methyl ethyl ketone.

Example 7

The same procedure as described in example 1 was employed. The same amount of Hoveyda-Grubbs catalyst second generation (HG2) and 5 ml of 1-hexene as co-olefin were purged to the reactor during the metathesis period. After 5 hours of metathesis, the molecular weight $M_w$ of the nitrile rubber decreased from 240,000 to 109,051 with a PDI of 2.5. After 4 hours hydrogenation, the hydrogenation degree reached 98%. No visible gel was generated and the resultant polymer was easy soluble in methyl ethyl ketone.

TABLE 2

Tandem metathesis/hydrogenation NBR latex;
(Mw of the initial nitrile rubber: 240,000 g/mol)

| | | | | Metathesis | | | Hydrogenation | |
| --- | --- | --- | --- | --- | --- | --- | --- | --- |
| Example | Catalyst | Co-olefin | solvent | Time (hrs) | Mw (g/mol) | PDI | Time (hrs) | Conversion (%) |
| 1 | G2 0.0195 g | — | MCB, 5 ml | 10 | 138,131 | 2.5 | 3 | 99 |
| 2 | G1 0.0195 g | — | MCB, 15 ml | 10 | 180,812 | 2.7 | 12 | 93 |
| 3 | G2 0.0310 g | — | MCB, 10 ml | 15 | 78,192 | 2.3 | 2 | 99 |
| 4 | G2 0.0195 g | styrene, 10 ml | — | 6 | 60,207 | 2.2 | 3 | 98 |
| 5 | G2 0.0195 g | styrene, 10 ml | MCB, 10 ml | 6 | 30,433 | 2.1 | 1 | 98 |
| 6 | G2 0.0195 g | propylene, 150 psi | MCB, 15 ml | 5 | 96,782 | 2.4 | 3 | 98 |
| 7 | HG2 0.0195 g | 1-hexene, 5 ml | MCB, 15 ml | 5 | 109,051 | 2.5 | 4 | 98 |

The invention claimed is:

1. A process for preparing a hydrogenated diene-based polymer, the process comprising:
subjecting a diene-based polymer to a metathetic degradation in a first step at a temperature of 10° C. to <100° C. to produce a degraded polymer, and
subsequent to the metathetic degradation, increasing the temperature to 100° C. to 200° C., introducing hydrogen gas and hydrogenating the degraded polymer in a second step at the temperature of 100° C. to 200° C., wherein:
a) the diene-based polymer is present in an aqueous suspension and both of the first and second steps are performed in sequence in the same aqueous suspension, and
b) both steps are performed in the presence of at least one catalyst, wherein the at least one catalyst is the same for both steps and is chosen from the group consisting of:
(i) compounds having the general formula (A), and

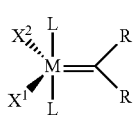

(ii) compounds having the general formula (B)

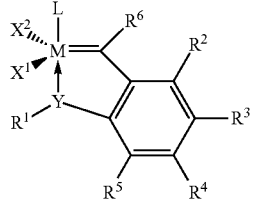

wherein
M is osmium or ruthenium,
$X^1$ and $X^2$ are identical or different anionic ligands,
L are identical or different ligands, wherein in general formula (A) both ligands L may also be linked to each other thereby forming a bidentate ligand,
R are identical or different and are each hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, where these radicals may in each case optionally be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms,
Y is oxygen (O), sulphur (S), an N—$R^1$ radical or a P—$R^1$ radical, where $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical, and R⁵ is hydrogen or an alkyl, alkenyl, alkynyl or aryl radical.

2. The process according to claim 1, wherein the diene-based polymer contains repeating units of at least one ($C_4$-$C_6$) conjugated diene.

3. The process according to claim 2, wherein the diene-based polymer additionally contains repeating units of at least one further copolymerizable monomer.

4. The process according to claim 3, wherein the diene-based polymer is a copolymer of 1,3-butadiene and acrylonitrile.

5. The process according to claim 1, wherein the catalyst is a catalyst of general formula (A) wherein:
M is Ruthenium,
$X^1$ and $X^2$ independently represent chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO$) or trifluoromethanesulfonate ($CF_3SO$),
L are identical or different and represent a phosphine, sulphonated phosphine, phosphate, phosphinite, phosphonite, arsine, stibine, ether, amine, amide, sulphoxide, carboxyl, nitrosyl, pyridine, thioether or a NI-heterocyclic carbene ligand, and
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals.

6. The process according to claim 1, wherein the catalyst is a catalyst of general formula (A) wherein:
M is Ruthenium
$X^1$ and $X^2$ represent chlorine,
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_3$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{30}$-alkylsulphonyl or $C_1$-$C_{20}$-alkylsulphinyl, where these radicals may in each case be substituted by one or more alkyl, halogen, alkoxy, aryl or heteroaryl radicals, and
L are identical or different and are selected from the group consisting of $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4-SO_3Na)_3$, $P(CH_2C_6H_4-SO_3Na)_3$, $P(isopropyl)_3$, $P(CHCH_2(CH_2CH_3))_3$, $P(cyclopentyl)_3$, $P(cyclohexyl)_3$, $P(neopentyl)_3$ and $P(neophenyl)_3$, wherein Ph means phenyl and Tol means tolyl.

7. The process according to claim 1, wherein the catalyst is a catalyst of general formula (A) wherein:
M is Ruthenium
$X^1$ and $X^2$ represents chlorine,
one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may in each case be substituted by one or more alkyl, halogen, alkoxy, aryl or heteroaryl radicals, one L is selected from the group consisting of $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4-SO_3Na)_3$, $P(CH_2C_6H_4-SO_3Na)_3$, $P(Isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, wherein Ph means phenyl and Tol means tolyl, and one L represents a N-heterocyclic carbene ligand according to general formulae (IIa) to (IIe)

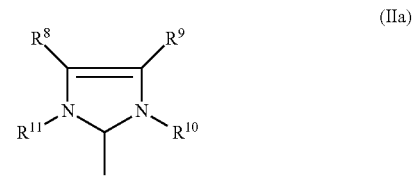

(IIa)

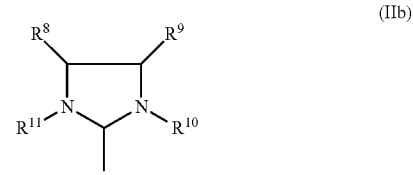

(IIb)

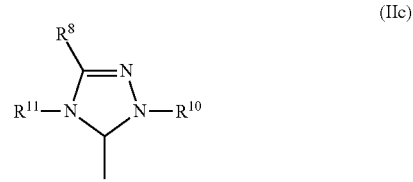

(IIc)

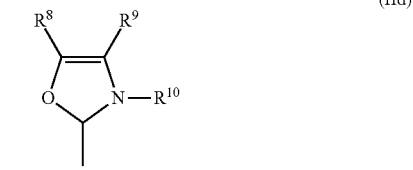

(IId)

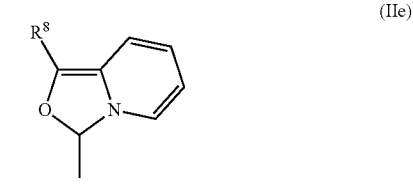

(IIe)

wherein:
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$-heteroaryl, $C_2$-$C_{20}$-heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{24}$-arylthio, —Si(R)$_3$, —O—Si(R)$_3$, —O—C(=O)R, —C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

8. The process according to claim 1, wherein the catalyst Is a catalyst of general formula (B) wherein:

M is Ruthenium $X^1$ and X independently represent chlorine, $CF_3COO$, $CH_3COO$, $CFH_2COO$, $(CH_3)_3CO_3$ $(CF)_2(CH_3)CO$, $(CF_3)(CH_3)_2CO_3$ phenoxy, methoxy, ethoxy, tosylate (p-$CH_3$—$C_6H_4$—$SO_3$), mesylate ($CH_3SO$) or trifluoromethanesulfonate ($CF_3SO_3$), Y is oxygen, $R^1$ is $C_3$-$C_{20}$-cycloalkyl, $C_6$-$C_{24}$-aryl or a straight-chain or branched $C_1$-$C_{30}$-alkyl radical, with the latter being optionally interrupted by one or more double or triple bonds or one or more heteroatoms, and $R^2$, $R^3$, $R^4$, $R^5$ are identical or different and are each hydrogen, halogen, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

9. The process according to claim 1, wherein the catalyst is a catalyst of general formula (B) wherein:

M is Ruthenium, $X^1$ and $X^2$ represent chlorine,

Y is oxygen, $R^1$ is a straight-chain or branched $C_1$-$C_{12}$-alkyl radical, and $R^2$, $R^3$, $R^4$, $R^5$ are identical or different and are each hydrogen, chlorine or bromine, nitro, $CF_3$, $C_1$-$C_{10}$-alkyl, $C_3$-$C_{10}$-cycloalkyl, $C_2$-$C_{10}$-alkenyl, $C_2$-$C_{10}$-alkynyl, $C_6$-$C_{14}$-aryl, $C_1$-$C_{10}$-alkoxy, $C_2$-$C_{10}$-alkenyloxy, $C_2$-$C_{10}$-alkynyloxy, $C_6$-$C_{14}$-aryloxy, $C_2$-$C_{10}$-alkoxycarbonyl, $C_1$-$C_{10}$-alkylamino, $C_1$-$C_{10}$-arylthio, $C_6$-$C_{14}$-arylthio, $C_1$-$C_{10}$-alkylsulphonyl or $C_1$-$C_{10}$-alkylsulphinyl which may in each case optionally be substituted by one or more $C_1$-$C_{10}$-alkyl, $C_1$-$C_{10}$-alkoxy, halogen, $C_6$-$C_{14}$-aryl or heteroaryl radicals.

10. The process according to claim 1, wherein the catalyst is at least one catalyst of structure (IV), (V) or (VI)

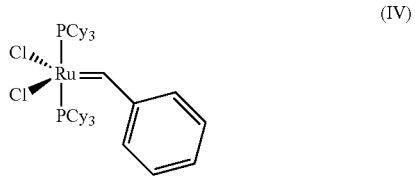
(IV)

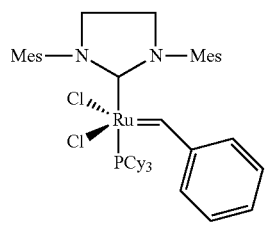
(V)

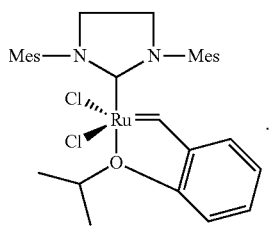
(VI)

11. The process according to claim 1, wherein the first step of metathetic degradation is carded out at a temperature of 10° C. to 150° C., and the second step of hydrogenation is carded out at a temperature of 60° C. to 200° C. and at a hydrogen pressure of 0.5 MPa to 35 MPa.

12. The process according to claim 1, further comprising using 0.01 to 5.0% by weight of the at least one catalyst based on the weight of the solid content of the diene-based polymer in the aqueous suspension.

13. The process according to claim 1, further comprising dissolving the at least one catalyst in an organic solvent and then dosing the dissolved catalyst into the aqueous suspension containing the diene-based polymer to be subjected to the metathetic degradation and subsequently the hydrogenation.

14. The process according to claim 1, wherein the hydrogenation is done at a pressure of 0.5 MPa to 35 MPa.

15. The process according to claim 14, wherein prior to the metathetic degradation, the diene-based polymer in the aqueous suspension is degassed.

16. The process according to claim 15, wherein:

the diene-based polymer in the aqueous suspension is degassed with nitrogen gas at room temperature to produce a degassed aqueous suspension;

the at least one catalyst is added to the degassed aqueous suspension under nitrogen gas at room temperature to metathetically degrade the diene-based polymer;

subsequent to the metathetic degradation, the temperature is increased to 100° C. to 200° C.;

subsequent to increasing the temperature, the hydrogen gas is introduced at a pressure of 3.0 MPa to 10 MPa; and the hydrogen pressure and temperature are kept constant throughout the hydrogenation.

* * * * *